(12) United States Patent
Sibal et al.

(10) Patent No.: US 7,386,631 B1
(45) Date of Patent: *Jun. 10, 2008

(54) APPARATUS AND METHODS FOR PROVIDING TRANSLUCENT PROXIES IN A COMMUNICATIONS NETWORK

(75) Inventors: Sandeep Sibal, Matawan, NJ (US); Oliver Spatscheck, Morris Plains, NJ (US); Pablo Rodriguez, Foster City, CA (US)

(73) Assignee: AT&T Corp., New York, NY (US)

( * ) Notice: Subject to any disclaimer, the term of this patent is extended or adjusted under 35 U.S.C. 154(b) by 348 days.

This patent is subject to a terminal disclaimer.

(21) Appl. No.: 11/213,061

(22) Filed: Aug. 26, 2005

Related U.S. Application Data (63) Continuation of application No. 09/713,214, filed on Nov. 16, 2000, now Pat. No. 7,016,973.

(60) Provisional application No. 60/166,433, filed on Nov. 19, 1999.

(51) Int. Cl.
*G06F 15/16* (2006.01)
*G06F 15/173* (2006.01)

(52) U.S. Cl. ............. 709/238; 709/203; 709/224; 709/227; 709/245

(58) Field of Classification Search ........ 709/202, 709/203, 219, 243, 245
See application file for complete search history.

(56) References Cited

U.S. PATENT DOCUMENTS

| | | | |
|---|---|---|---|
| 5,392,400 A | 2/1995 | Berkowitz et al. | |
| 6,047,332 A * | 4/2000 | Viswanathan et al. | 709/245 |
| 6,061,734 A | 5/2000 | London | |
| 6,073,178 A | 6/2000 | Wong et al. | |
| 6,105,027 A | 8/2000 | Schneider et al. | |
| 6,212,563 B1 | 4/2001 | Beser | |
| 6,438,576 B1 * | 8/2002 | Huang et al. | 709/202 |
| 6,473,406 B1 | 10/2002 | Coile et al. | |
| 6,532,217 B1 | 3/2003 | Alkhatib et al. | |
| 6,560,640 B2 * | 5/2003 | Smethers | 709/219 |
| 6,567,857 B1 | 5/2003 | Gupta et al. | |
| 6,594,260 B1 | 7/2003 | Aviani et al. | |
| 6,650,641 B1 | 11/2003 | Albert et al. | |
| 6,697,360 B1 | 2/2004 | Gai et al. | |
| 6,848,079 B2 * | 1/2005 | Ito | 709/203 |
| 2003/0088699 A1 * | 5/2003 | Luciani et al. | 709/243 |

* cited by examiner

*Primary Examiner*—Quang N. Nguyen (57) ABSTRACT

The Translucent Proxying of TCP (TPOT) device and methods use TCP-OPTIONS and IP tunneling to guarantee that all IP packets belonging to a specific TCP connection will traverse the proxy which intercepts the first packet of data. This guarantee allows the ad-hoc deployment of TPOT devices anywhere within the communication network, and does not restrict the placement of proxy devices at the edge of the network. Furthermore, no extra signaling support is required for the TPOT device to properly function while the addition of TPOT devices to communication networks significantly improves the throughput of intercepted TCP packets of data.

28 Claims, 6 Drawing Sheets

APPARATUS AND METHODS FOR PROVIDING TRANSLUCENT PROXIES IN A COMMUNICATIONS NETWORK

This application is a continuation of U.S. patent application Ser. No. 09/713,214 filed Nov. 16, 2000 entitled APPARATUS AND METHODS FOR PROVIDING TRANSLUCENT PROXIES IN A COMMUNICATIONS NETWORK, now issued as U.S. Pat. No. 7,016,973 on Mar. 21, 2006, and claims priority to U.S. Provisional Application filed Nov. 19, 1999 and assigned Ser. No. 60/166,433. The aforementioned related patent applications are herein incorporated by reference.

BACKGROUND OF THE INVENTION

1. Field of Invention

This invention relates to communication systems.

2. Description of Related Art

Currently, transparent layer proxies are being widely deployed in the Internet to enable a vast variety of applications. The proxies are used for web proxy caching, as transcoders, firewalls and to distribute load among a group of servers. Transparent proxies are commonly used in solutions when an application is to be proxied in a manner that is completely invisible to a client, without requiring any prior configuration. Recently, there has been a great deal of activity in the area of transparent proxies for Web caching. A proxy server caches information for internal users who access and request information via the Internet. These Web caching devices cache often-accessed pages to improve access for Internet users.

In the simplest scenario, a transparent proxy intercepts all Transmission Control Protocol (TCP) packets of data that are routed through the transparent proxy. This function may be refined by having the proxy intercept TCP packets destined only for specific ports or a specific set of destination addresses. The proxy's function is to respond to the client request, many times while masquerading as the remote web server. Scalability is achieved by partitioning client requests into separate hash buckets based on the destination address, effectively mapping web service to multiple caches attached to the proxy.

Two types of proxies are commonly used at Layer 4 and Layer 7 of the OSI networking stack. A Layer-4 switch (or simply L-4 switch) functions to intercept TCP packets of data as described earlier. However, a Layer-7 switch (or L-7 switch) parses a Hyper Text Transfer Protocol (HTTP) request and extracts the Universal Resource Locator (URL), and possibly other fields of the HTTP request before deciding what to do with the request. Furthermore, the inspection of the HTTP request takes part in the applications layer or Layer 7.

A problem associated with the use of transparent L-4 and L-7 Web proxies is that the proxies must be located at focal points in a network to ensure that all IP packets of an intercepted TCP connection are seen by the intercepting transparent proxy. Since routing functions in an Internet Protocol (IP) network can lead to situations where multiple paths from client to server may be cost effective, situations may occur where packets of a connection follow multiple paths. Subsequently, in this situation, a transparent proxy may see only a fraction of packets of a specific connection. In another situation, routes may change mid-way through a TCP connection due to routing updates within the IP network. For these reasons, transparent proxies are deployed exclusively at the edges or focal points within a network and used as gateways to/from single-homed client or servers. However, locating the proxy at the edge or focal point with a network is not always the best place to deploy a proxy acting as a Web cache. Studies for Web caching file objects suggest that a Web cache is more effective when it is located inside the network instead of at the edge of a network.

Accordingly, there is a need for new technology that will allow more flexibility in the placement of proxy devices anywhere in a communications network.

SUMMARY OF THE INVENTION

The present invention provides an apparatus for allowing proxies to be located anywhere within a communications network. In addition to allowing the placement of proxy devices anywhere in a network, the Translucent Proxying of TCP (TPOT) device of the claimed invention is an intermediary device that also enables newer architectures that employ non-TPOT enabled web proxy networks to be used in accordance with the present invention. In general, such architectures require the placement of multiple proxies within the network, not just at their edges and gateways. Existing proposals are either not transparent, or require the guarantee that all packets of the connection will pass through an intercepted proxy. A TPOT proxy according to the present invention located along the path from the client to the server simply picks up the request and satisfies the request from the TPOT proxy's own cache, or lets the request pass through. None of the TPOT functions require extra signaling support or knowledge of neighbors to function correctly. Because TPOT is a lightweight solution that does not require a complete overhaul of an existing IP networks, the TPOT can be deployed incrementally and can co-exist with other Internet traffic.

The TPOT device and methods use TCP-OPTIONS and IP tunneling to guarantee that all IP packets belonging to a specific TCP connection will traverse the proxy which intercepts the first packet of data. This guarantee allows the deployment of TPOT devices anywhere within the communication network, and does not restrict a network system engineer to only placing the proxy device on the edge of a network. Furthermore, no extra signaling support is required for the TPOT device to properly function. Accordingly, the addition of TPOT devices to communication networks will significantly improve the throughput of intercepted TCP packets of data.

BRIEF DESCRIPTION OF THE DRAWINGS

The invention is described in detail with regard to the following figures, in which like elements are referred to with like numerals, and in which.

DETAILED DESCRIPTION OF PREFERRED EMBODIMENTS

The present invention provides a proxying device that allows the placement of proxies anywhere within a network so that all IP packets belonging to a TCP connection will traverse the proxy which intercepts a first packet of data. Each IP packet typically contains an IP header and a TCP segment. The IP header contains the packet's source and destination IP address. The TCP segment contains a TCP header that includes the source port and the destination port so that the IP packet may be delivered via a communication link. This 4-tuple of the IP addresses and port numbers of the source and destination uniquely identify the TCP connection that is associated with a specific data packet. In addition, the TCP header contains both a flag that indicates whether the plate packet is a SYN packet and an ACK flag and sequence number that acknowledges the receipt of data from its peer. The SYN character within the data packet is a control character used to establish a TCP connection, and also used as time-fill in the absence of data. Furthermore, a TCP header may also contain TCP-OPTIONS "(i.e., the "TPOT" option) which can be used for custom signaling when the communication needs to be modified from the conventional TCP protocol.

In addition to the above basic format of an IP packet, an IP packet can also be encapsulated in another IP packet. This concept is known as IP tunneling, which temporarily changes the destination of a packet in order to traverse one or more routers. At the source, this concept involves prefixing an IP header with an IP address of an intermediate tunnel point on an IP packet. On reaching the intermediate tunnel point, the IP header of the intermediary is stripped off, while the remaining IP packet is then processed as usual.

The TPOT device guarantees that it will intercept a first packet of data (and all other data packets) by making an innovative use of TCP-OPTIONS and IP tunnels. A source initiating a TCP connection signals to potential proxies within a communications path that the source and data packet are TPOT-enabled by setting a TCP-OPTION within the SYN packet of data. When a TPOT proxy identifies such a SYN packet, it intercepts the packet and returns to the source an ACK packet which carries the TPOT proxy's IP address along with a TCP OPTION. On receiving this ACK message, the source then sends the rest of the packets via the intercepting TPOT proxy over an IP tunnel.

Figure 1:
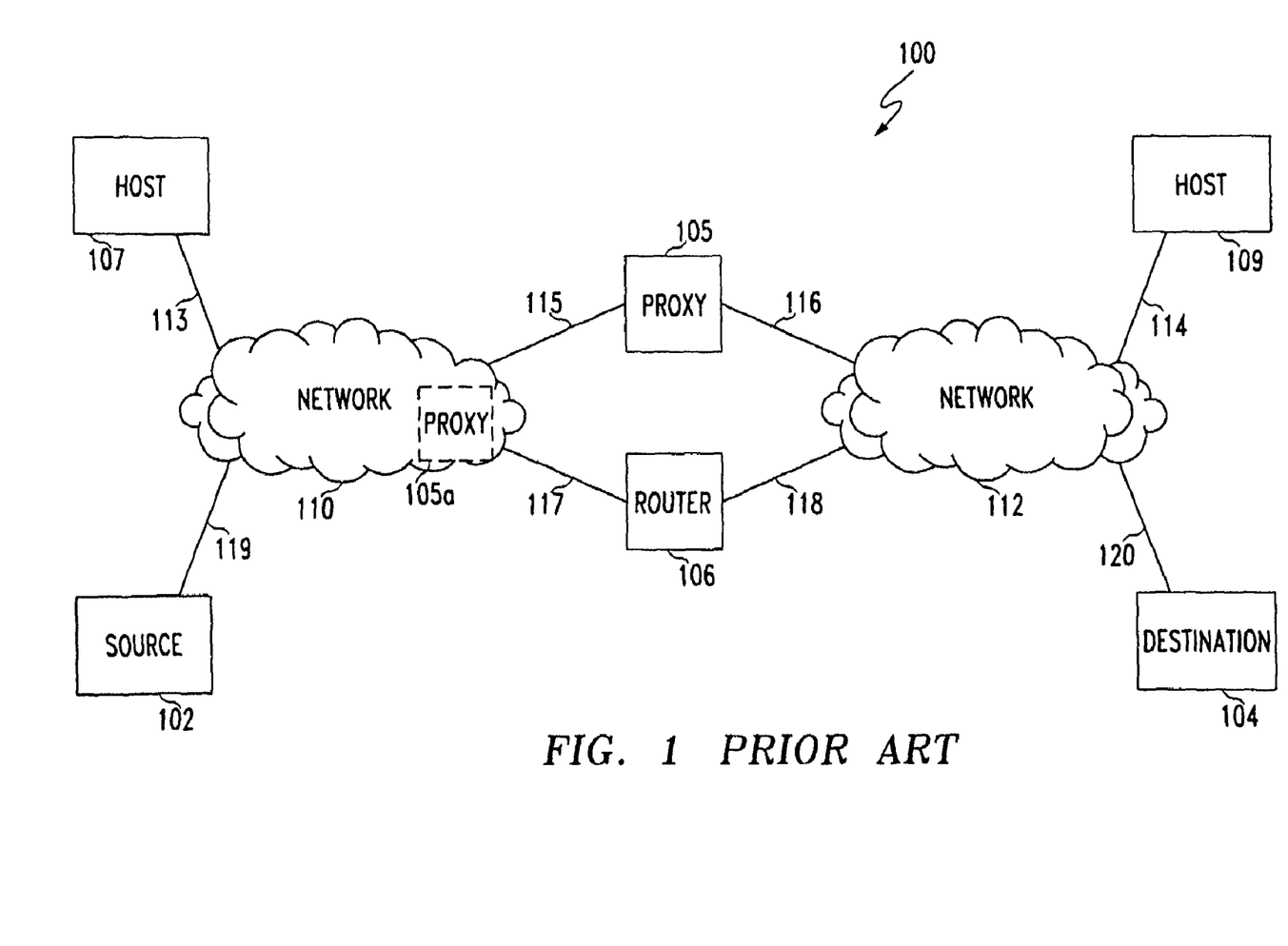
FIG. 1 is an exemplary block diagram of a communication system employing a conventional proxy device.

FIG. 1 is an exemplary block diagram of a conventional transparent proxy device 105 used in a communication system 100. As shown in FIG. 1, the system 100 includes source 102 and destination 104 coupled to networks 110 and 112 through communication links 119 and 120. The networks 110 and 112 each are connected to hosts 107 and 109 through communication links 113 and 114. A proxy 105 is connected to both networks 110 and 112 via communication links 115 and 116. Furthermore, a second communication path is established between networks 110 and 112 via communication lines 117 and 118, and router 106.

In this conventional system, if a user at source 102 desires to send a request to network 112 and destination 104, the user would do so using source 102 and network 110 operating systems and protocols. However, in order to guarantee that proxy 105 intercepts all data packets related to the request, the proxy 105 must be strategically located on the edge of the network 110. But, by positioning proxy 105 in the position shown in FIG. 1, the proxy cannot provide a guarantee to intercept all the packets of the request from source 102 because some, or all, of the data packets may traverse to network 112 via communication links 117 and 118. In order to guarantee that proxy 105 will intercept all packets of data of the request, proxy 105 has to be located on the edge of network 110, as shown by proxy 105a. As discussed earlier, locating the proxy at such a focal point does not necessarily maximize the capabilities of the proxy and can be costly.

Because locating the proxy device at the edge or focal point within a network may not be the ideal place to locate the proxy device, and because placing proxy devices within several devices is not cost effective, the present invention allows a TPOT proxying device to be placed anywhere on the network and still supply a guarantee that all the packets of data will be seen.

Figure 2:
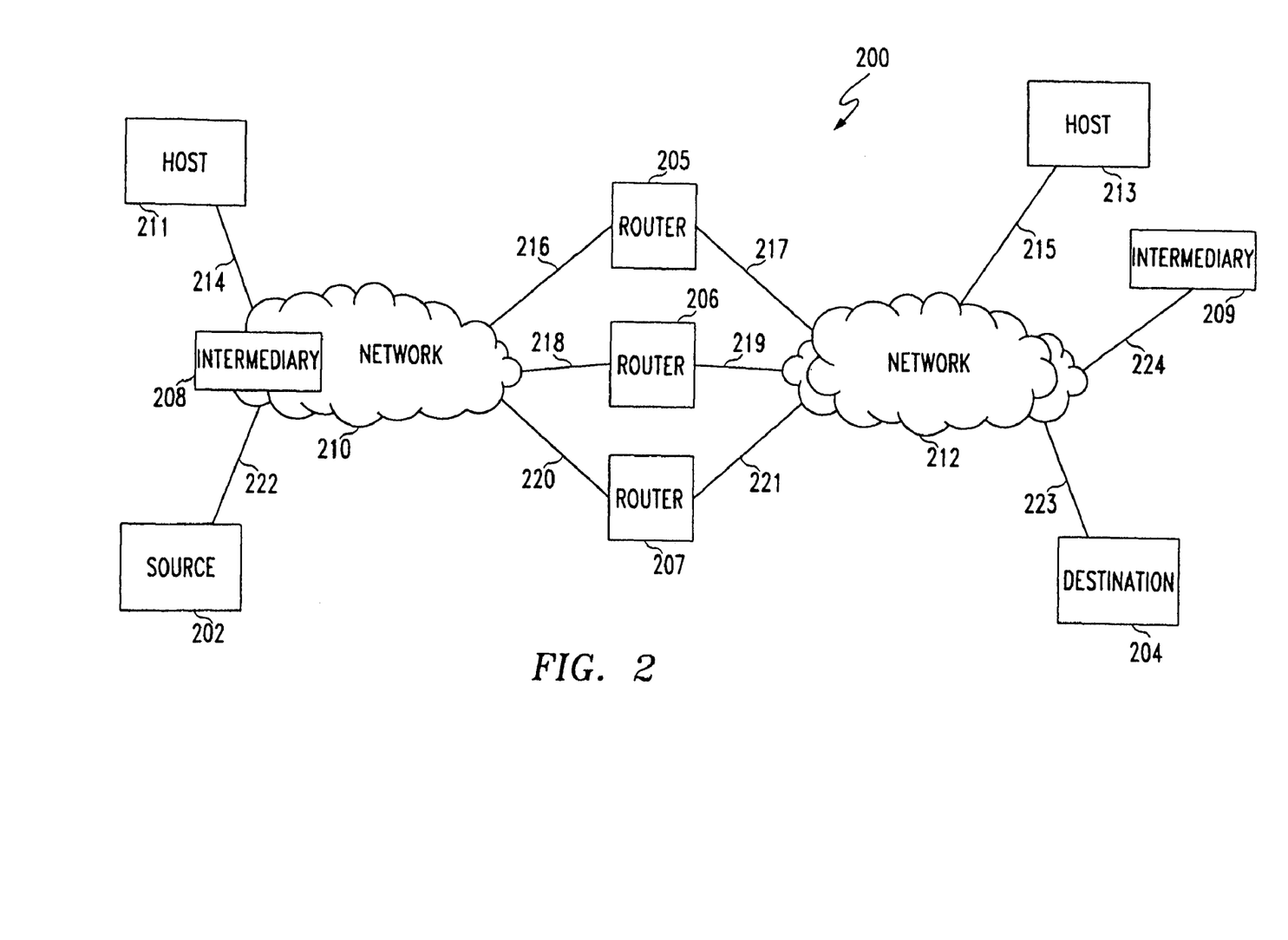
FIG. 2 is an exemplary block diagram of a communication system employing a proxy device in accordance with the present invention.

FIG. 2 shows a communication system 200 having intermediary devices 208 and 209 for transmitting data communication over networks 210 and 212. The communication system 200 of FIG. 2 includes source 202 and destination 204 coupled to networks 210 and 212 via communication links 222 and 223. The system 200 further includes routers 205-207 that are located in between networks 210 and 212, and can be any routing device capable of performing traditional router functions.

The source 202 and destination 204 can be devices of any type that allow for the transmission and/or reception of communication signals. For example, the source 202 and destination 204 can be land-line telephones, cellular telephones, computers, personal digital assistance, video telephones, video conference apparatuses, smart or computer assisted television, web TV and the like. For the purposes of the following description of the present invention, it will be assumed that source 202 and destination 204 are personal computers.

The communication links 214-223 may be any type of connection that allows for the transmission of information. Some examples include conventional telephone lines, digital transmission facilities, fiber optic lines, direct serial/parallel connections, cellular telephone connections, satellite telecommunication links, radio frequency (RF) links, local area networks (LANs), Intranets and the like.

The networks 210 and 212 may be single networks or a plurality of networks on the same or different types. For example, network 210 or 212 may include the local telephone network: of a Local Exchange Carrier in connection with the long distance network of an Interexchange Carrier (such as the AT&T long distance telephone network). Further, the networks 210,212 can be a data network alone or in combination with a telecommunications network. Any combination of telecommunications and data networks may be used without departing from the spirit and scope of the present invention. For the purposes of discussion, it will be assumed that the networks 210 and 212 are data networks.

When a user at source 202 desires to send a request to network 212, the end user utilizes the operating systems and network protocols of network 210. The request will be delivered to network 212 via communication links 215-221. The request could potentially be for any data, information, interfacing, etc., from other networks, telecommunications databases or warehouses.

Incorporated into the communication networks 210 and 212 in communication system 200 are intermediary devices 208-209. As noted in FIG. 2, the intermediary devices in accordance with TPOT can be located within a network, as with intermediary device 208 in network 210, and/or on the backside of a network, as with intermediary device 209 in network 212 or any other location. Any configuration that permits the coordinated transmission of data over networks 210 and 212 can be used without departing from the spirit and scope of the present invention. The intermediary devices 208 and 209 in the present invention can be an application-level gateway, circuit-level gateway, dual-homed gateway, a proxy server or any other proxy application running on a hardware device and acting as a proxy. Furthermore, intermediary devices 208 and 209 can be used as Web caches, transcoders, firewalls and to distribute load among servers.

When an end user at source 202 desires to send a data request to network 212 and destination 204, the user utilizes source 202 the operating systems and protocols of network 210. Dependent upon traffic load, data type, etc., the request will be delivered to destination 204 using some or all of communication links 216-221. Because the request will be separated into multiple packets in accordance with the TCP and IP protocol, one or any combination of the communication paths 216-221 may be utilized to deliver the request in packetized form to network 212. As described with reference to FIG. 1, because multiple paths can be used to deliver the packets of information, there is no guarantee that a specific proxy will intercept every packet of data. However, as shown in FIG. 2, intermediary devices 208 and 209 are used in accordance with the TPOT method, and thus, there is a guarantee that the intermediary devices 208 and 209 will intercept the packets incorporating the request.

In operation, a source 202 initiates a TCP connection signal to the intermediary device 208 by setting a TCP-OPTION within the SYN packet. When intermediary device 208 identifies the SYN packet, the intermediary device 208 intercepts the data packet. The intermediary device 208 then responds to the SYN packet by transmitting an ACK packet to source 202 that acknowledges receipt of the request. On receiving the ACK packet, the source 202 sends the rest of the data packets via the intermediary device 208 over an IP tunnel via links 216-221 directly to intermediary TPOT device 209, and by-passes routers 205-207. Because the request has been specifically identified as a TPOT request, all subsequent packets of data related to the request will be intercepted by the intermediary devices 208 and 209 configured for TPOT along the communications route. Accordingly, there is no risk of data packets related to the request being intercepted by routers 205-207. If the routers 205-207 cannot recognize the TPOT identifier in the OPTION field, then the routers 205-207 may take no action and forward the packet on its fast-path.

Figure 3:
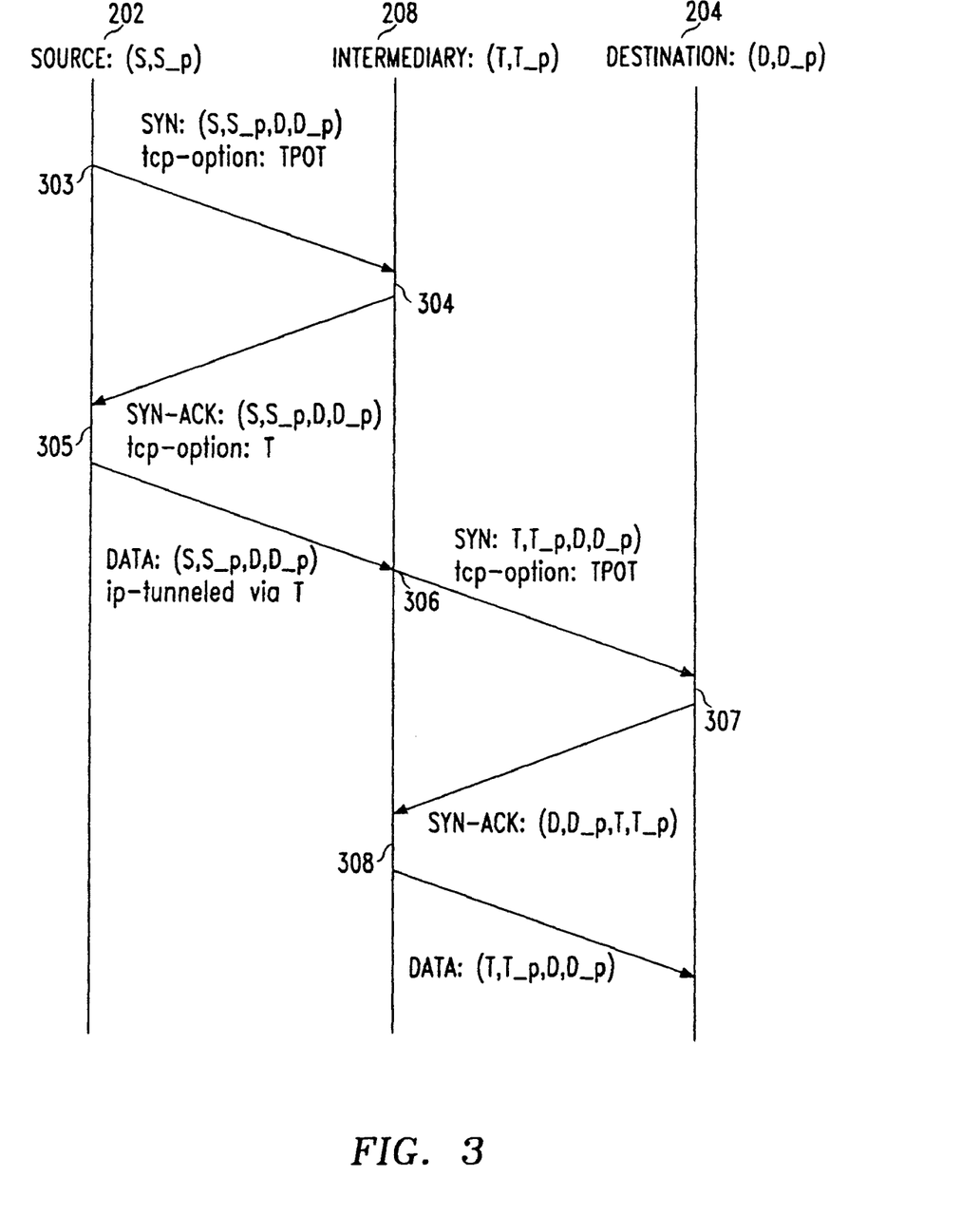
FIG. 3 is an exemplary signaling diagram of the protocol functions applicable to the present invention.

FIG. 3 is an exemplary signaling diagram of the TPOT protocol and associated functions in accordance with the present invention, and is typical of how an L-7 switch would operate. In FIG. 3, a source 202, such as the host 202 in FIG. 2, is operated by end user in a manner to request data from destination 212, such as the network 212, and point 303. In order to retrieve data from a destination 212, the source 202 needs to establish a connection with the destination 212 via TCP. Once the end user requests data via host 202, the first 8YN packet is sent out by the source 202 to the destination 212 via the intermediary device 208, such as the intermediary device 208 in FIG. 2. In the example in FIG. 2, the notation (S, S_p, D, D_p) is used to describe a packet that is headed from source 202 to destination 212, and has Sp and Dp as the source and destination ports respectively. Furthermore, the notation (T, T -p, D, D -p) is used to describe a packet that is headed from intermediary device 208 to destination 212. In each example, the notations 8 and T represent the IP addresses of the source 202 and intermediary device 208, respectively.

In FIG. 3, the source 202 transmits the request at point 303 to intermediary device 208 which receives the request at point 304. The request includes the SYN packet that has the TCP-OPTION listed as TPOT. The intermediary device 208 then responds to the request from the source 202 by sending a SYN-ACK packet back to source 202 that has the TCP-OPTION with its own address listed as T. The source 202 receives the SYNACK packet at point 305, and in turn responds by transmitting the remaining packets of data, IP tunneled via intermediary device 208 (point 306) to destination 212 at point 307. The destination 212 then responds to the intermediary device 208 with a SYN-ACK packet. Intermediary device 208 receives the SYN-ACK packet the from destination 212 at point 308, and in turn responds by sending the remaining packets of that TCP connection to destination 212. While for the purposes of simplicity, only an intermediary device 208 is shown, it is to be understood that numerous intermediaries may exist without departing from the spirit and scope of the present invention.

In order to co-exist peacefully with other end-points that do not wish to talk using the TPOT protocol, the present invention can utilize a special TCP-OPTION "TPOT" that a source 202 uses to explicitly indicate to intermediary device 208 within the network that they are interested in using the TPOT mechanism. If the intermediary device 208 does not understand this option, the intermediary device 208 will take no action and simply forward the packet onto its destination using its fast-path. However, if intermediary device 208 sees a SYN packet that has the TCP-OPTION "TPOT" set, it can respond to the source 202 with a SYN-ACK that encodes its own IP address Tin the TCP-OPTION field. Upon receiving this packet, the source 202 must then send the remaining packets of the TCP connection, IP tunneled to intermediary device 208.

One technique for implementing the TCP-OPTION is to add additional bytes of information within the IP header by adding the IP address of intermediary device 208 as a destination address to all packets that the source 202 sends out for that TCP connection. However, because this additional header is removed on the next TPOT proxy, the total overhead is limited regardless of the number of TPOT proxies intercepting the connection from the source to the final destination. This overhead can be further reduced by IP header compression.

For applications such as Web caching, where the intermediary device 208 may be able to satisfy a request from the source 202, the response is simply served from one or more caches attached to the intermediary device 208. In the case of a "cache miss," or for other applications where intermediary device 208 might connect to destination 212 after inspecting some data, the intermediary device 208 communicates with the destination as shown in FIG. 3. In FIG. 3, note that the intermediary device 208 sets the TCP-OPTION "TPOT" in its SYN to destination 212 at point 306 to allow possibly another TPOT along the way to again proxy the connection (i.e., intermediary device 209 in FIG. 2).

Figure 4:
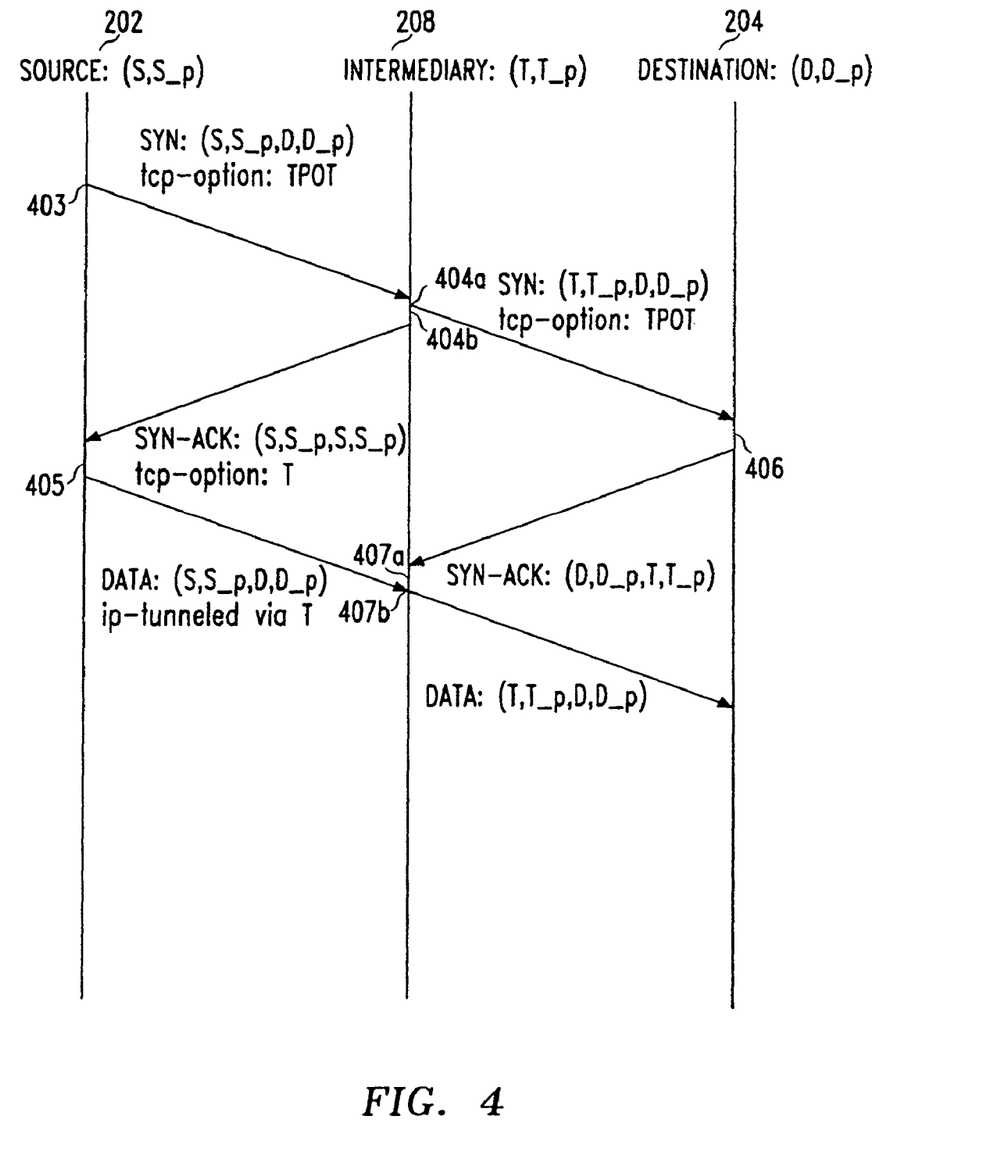
FIG. 4 is another exemplary signaling diagram of the protocol functions in accordance with the present invention.

Based on optimization choices and the level of protocol within the data packet, the degree in which the transmission of multiple frames of data is allowed without waiting to see if the frames are acknowledged on an individual basis can be extended even more in order to reduce the number steps between sending data from a source to a destination. This technique is known as pipelining. As shown in FIG. 4, based on a received request, a source 202 can transmit the SYN packet incorporating the TPOT identifier in the TCP-OPTION. The origination of this data packet begins at point 403, however, unlike FIG. 3, a parallel connection is established at point 404 when the intermediary 208 receives the SYN packet. Based on the complexity of the protocol within the packet, and/or a developer's optimization choice, it is possible for intermediary device 208 to pipeline the handshake by sending out the original SYN packet to the destination 212 immediately after receiving the SYN packet from source 202. This function would occur at point 404a in FIG. 4. At the same time, at point 404b, intermediary device 208 delivers a SYN-ACK with its own address Tin the TCPOPTION field packet back to source 202.

The degree of pipe lining depends on the objective of the proxying mechanism. In the case of an L-4 proxy for Web Caching, the original SYN packet contains the destination IP address and port number. Since L-4 proxies do not inspect the content, no further information is needed from the connection before deciding a course of action. In this situation, a SYN packet can be sent out by the intermediary device 208 to the destination 212 almost immediately after the intermediary 208 receives a SYN packet from the source 202.

However, in the case of L-7 switching, the proxy located at the intermediary device 208 would need to inspect the HTTP request (or at a minimum the URL in the request). In this situation, and as was seen in FIG. 3, a parallel connection should not be established by the intermediary device 208. Because the request is typically not sent with the SYN, a SYN sent out to the destination 213 can only happen after the first ACK is received by the intermediary device 208 from the source 202.

With the parallel connection, if the pipelining can be extended at point 404a immediately after receiving the SYN packet from source 202, then the destination 212 receives the data packet at point 406, while the source 202 receives the SYN-ACK packet at point 405. The destination 212 then responds to the intermediary device 208 by transmitting a SYN-ACK data packet, which is received by the intermediary device 208 at point 407a. The intermediary device 208 receives this data packet and interprets the packet to acknowledge that the destination 213 is ready to receive the flow of data. Accordingly, the intermediary device 208 responds by sending the remaining packets of data of that TCP connection that were received by the source 405 through an IP tunnel.

As a further sophistication of the TPOT device, it is possible for multiple proxied TCP connections that share connections to be pooled at the intermediary device 208 that may contain TPOT proxies. In general, this configuration improves the throughput and fairness of TCP connections.

Figure 5:
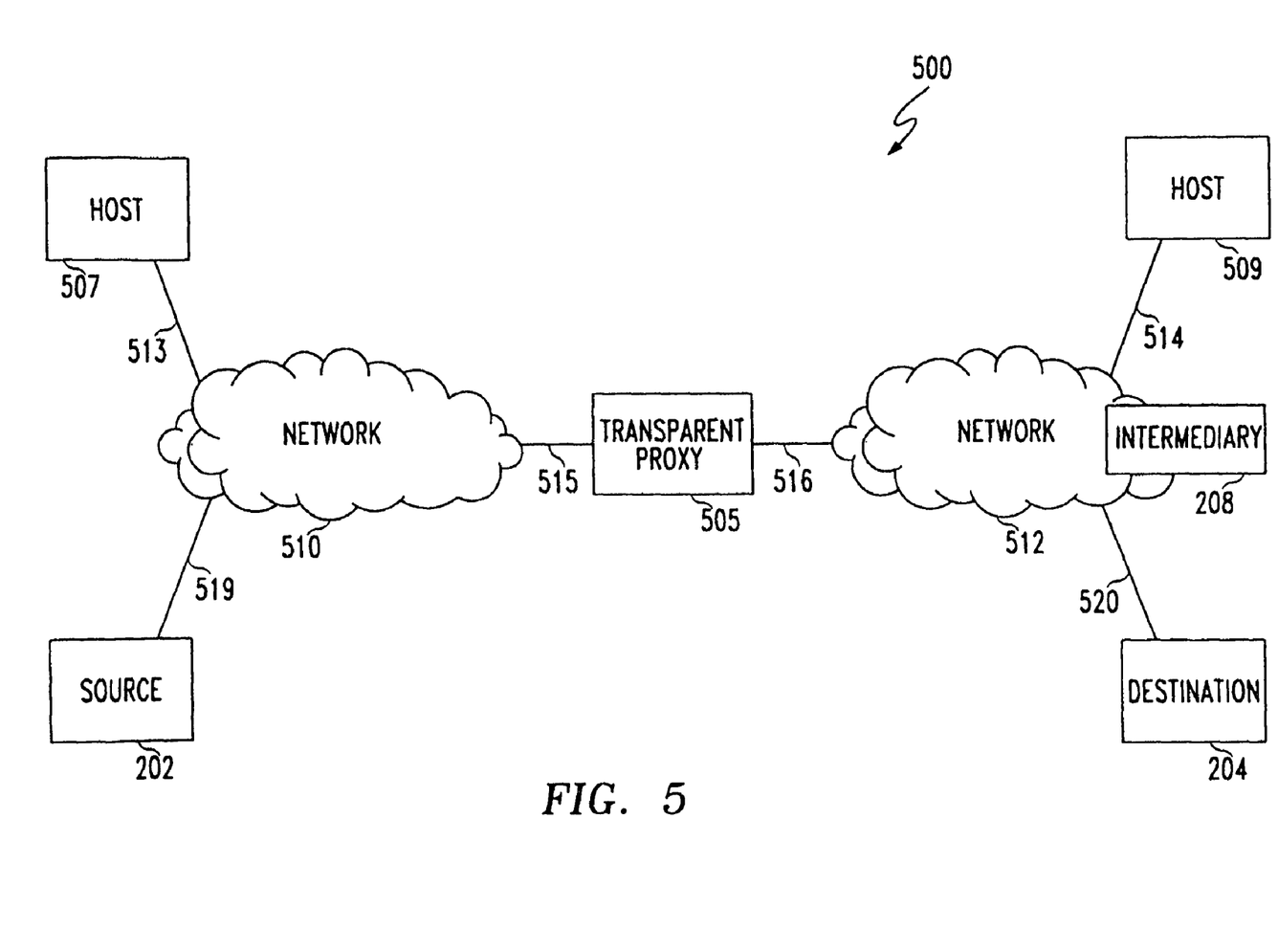
FIG. 5 is an exemplary block diagram of an embodiment of the proxy device and system in accordance with the present invention.

FIG. 5 shows an exemplary block diagram of another embodiment of the proxy device and system in accordance with the present invention. All of the communication system devices communication links and network features correspond to those described in FIG. 2. However, in this embodiment the network 510 and associated devices are non TPOT enabled. On the contrary, the network 512 and associated devices incorporate the intermediary device 208 in accordance with the TPOT method within the network. Located in between network 510 and 512, via communication links 515 and 516, is a transparent proxy 505. Transparent proxy 505 is configured at a focal point between networks in order to ensure that all packets of information will pass through the transparent proxy device 505. Furthermore, in this embodiment, transparent proxy 505 is used to enable TPOT for non-TPOT aware clients in network 510.

As a result of enabling TPOT for data requests originating from source 202, the transparent proxy 505 terminates all TCP connection for certain TCP port numbers initiated by source 202 and instead uses a TPOT enabled TCPIIP stack to connect to the original destination of the connection. Accordingly, all subsequent interceptions by any other TPOT devices, such as the intermediary device 208, will treat the packets of data in accordance with the TPOT protocol and perform IP tunneling as required. In other words, the IP tunnel modules will function to attach and remove IP tunnel headers because IP tunnel headers are added to all IP packets sent after a SYN or a SYN-ACK with a TPOT option set has been received. The inner IP modules spoofs (i.e., filters unnecessary traffic from going over the communications link) for the original destination of the TCP connection. The outer IP module uses the real IP addresses of the source 202 of the TCP connection and the TPOT proxy which terminated the connection.

As a further sophistication of the TPOT device, it is possible for multiple proxied TCP connections that share connections to be pooled at the intermediary device 208 that may contain TPOT proxies. In general, this configuration improves the throughput and fairness of TCP connections.

Figure 6:
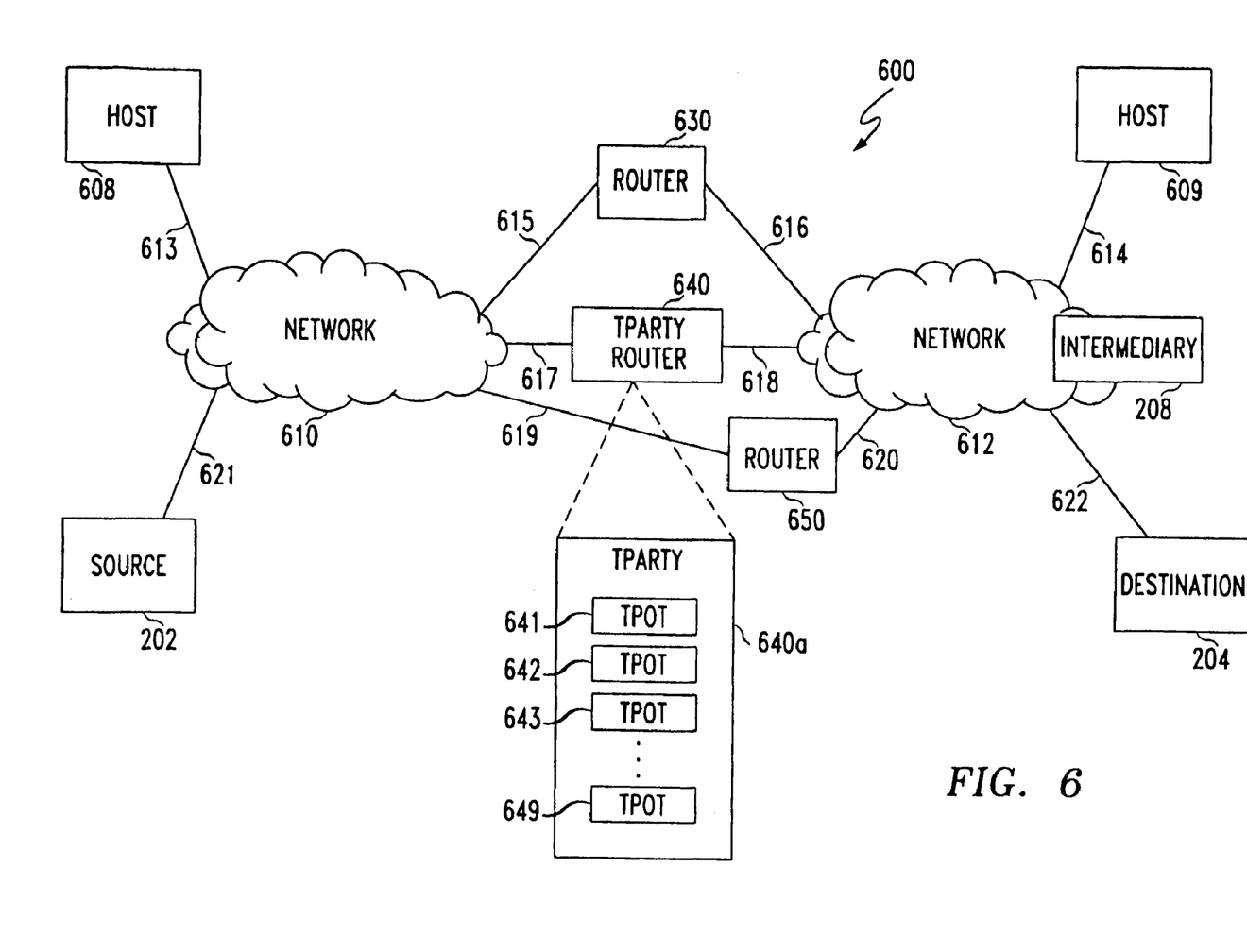
FIG. 6 is an exemplary block diagram of another embodiment of the proxy device and system used in accordance with the present invention.

FIG. 6 shows a third embodiment of the claimed invention. For high band width links which cannot be supported by a single TPOT device, a TPARTY configuration within a TPARTY router 640 can be used to scale TPOT. As seen in FIG. 6, TPARTY 640 uses a farm of TPOT devices 641-649 co-located within a router. In addition to routing, the TPARTY router 640 forwards TCP SYN packets for certain TCP port number, which have the TPOT option enabled, toward one of the TPOT devices 641-644. The router might forward the TPOT enabled SYNs in round-robin fashion or might use feedback from the TPOT devices 641-644 to make a more intelligent decision.

In this example, communication system 600 incorporates all of the devices, networks, and communication links as previously seen in the other embodiments of the present invention. However, when a TPOT-enabled SYN arrives at the TPARTY router 640, the first TPOT device 641 decides if it can handle the additional request. If TPOT device 641 cannot handle the request, the SYN is forwarded to TPOT device 642, which decides whether it can handle the request. The request continues to be handed off to additional TPOT devices until the request is satisfied. If none of the TPOT devices 641-644 can handle the request, the connection will not be proxied, and the SYN is sent back to the router 640 where the packet is routed as usual to the final destination. However, if the TPARTY has enough resources to deal with the connection, the proxy terminates the connection as described in the TPOT protocol using the IP address of the individual TPOT device as proxying address. In either case, all subsequent packets on the router 640 are routed as plain IP packets.

In all embodiments of the claimed invention, the TPOT devices either operate as TPOT proxies or as simple routers. If they operate as TPOT proxies, the first TPOT device enables the TPOT protocol and data is subsequently tunneled between the TPOT machine. Delays and losses are added in the device driver code of each TPOT device. Furthermore, the TPOT protocol can be implemented in any operating system. Examples of operating systems are, but not limited to, Scout, UNIX, MS-DOS and PICK, or any other software program which manages the basic operations of a computer system.

While this invention has been described in conjunction with the specific embodiments thereof, it is evident that many alternatives, modifications and variations will be apparent to those skilled in the art. Accordingly, preferred embodiments of the invention are set forth herein are intended to be illustrative, not limiting. There are changes that may be made without departing from the spirit and scope of the present invention.

What is claimed is:

1. A method for transmitting data over a network from a source to a destination through a plurality of intermediary devices, wherein said plurality of intermediary devices comprises at least one proxying device and at least one non-proxying device, the method comprising:
   receiving a request for data, said request having an identifier, wherein the identifier designates the request as a proxy-enabled request;
   recognizing the identifier in the request by said at least one proxying device;
   intercepting the request after recognizing the identifier and subsequently intercepting all of the remaining associated data packets so that requested data associated with the request will be forwarded by said at least one proxying device; and
   transmitting the requested data from the source to the destination through by said at least one proxying device.

2. The method in claim 1, wherein the request is configured into an initial message by a host, the message containing an option field enclosing the identifier that allows the requested data to be forwarded by said at least one proxying device.

3. The method in claim 1, wherein said at least one proxying device is a proxy, the proxy receiving from the source an initial message of the request that has the identifier in an option field, the proxy recognizing the identifier and responding to the source by sending an acknowledgment message to the source.

4. The method in claim 3, wherein the proxy is located anywhere within the network.

5. The method in claim 4, wherein the proxy encodes an address of the proxy in the option field within the acknowledgment message.

6. The method in claim 1, wherein said at least one proxying device is a router, the router forwarding the requested data toward the destination over the network without recognizing the identifier in an option field of a message.

7. The method in claim 5, wherein the proxy simultaneously forwards the initial message to the destination while the proxy is sending an acknowledgment message to the source, thereby establishing two simultaneous connections.

8. The method in claim 7, wherein after the source receives the acknowledgment message, the source transmits at least one additional message to the destination that corresponds to the requested data.

9. The method in claim 8, wherein each of the at least one additional message is configured by encapsulating a first packet of data within a second packet of data, prefixing a header of the first packet with an address of the proxy and the second packet with an address of the destination.

10. The method in claim 9, wherein the header of the first packet is stripped off after the message is received by the proxy, while the second packet is forwarded to the destination.

11. The method in claim 10, wherein the destination responds to the proxy after receiving the second packet by sending an acknowledgment message to the proxy.

12. The method in claim 11, wherein after the two simultaneous connections are established, the source responds to the acknowledgment message by transmitting at least one additional message to the destination that corresponds to the requested data and the destination responds to the initial message by transmitting an acknowledgment message to the proxy.

13. The method in claim 12, wherein the proxy responds to the acknowledgment message by transmitting at least one additional message to the destination that corresponds to the requested data.

14. The method in claim 13, wherein a plurality of proxies are located anywhere within a network and are used to forward the requested data to the destination.

15. A device that transmits data over a network from a source to a destination through a plurality of intermediary devices, wherein said plurality of intermediary devices comprises at least one proxying device and at least one non-proxying device, comprising:
   a receiving part that receives a request for data, which includes an identifier that designates the request as a proxy-enabled request;
   a recognition part in said at least one proxying device that recognizes the identifier in the request;
   an intercepting part that intercepts the request after the recognition and subsequently intercepting all of the remaining associated data packets so that requested data associated with said request will be forwarded by said at least one proxying device; and
   a transmitting part that transmits the requested data to the destination through said at least one proxying device.

16. The device in claim 15, wherein the request is configured into an initial message by a host, the message containing an option field enclosing the identifier that allows the requested data to be forwarded by said at least one proxying device.

17. The device in claim 15, wherein said at least one proxying device is a proxy, the proxy receiving from the source an initial message of the request that has the identifier in an option field, the proxy recognizing the identifier and responding to the source by sending an acknowledgment message to the source.

18. The device in claim 17, wherein the proxy is located anywhere within the network.

19. The device in claim 18, wherein the proxy encodes an address of the proxy in the option field within the acknowledgment message.

20. The device in claim 15, wherein said at least one proxying device is a router, the router forwarding the requested data toward the destination over the network without recognizing the identifier in an option field of a message.

21. The device in claim 19, wherein the proxy simultaneously forwards the initial message to the destination while the proxy is sending an acknowledgment message to the source, thereby establishing two simultaneous connections.

22. The device in claim 21, wherein after the source receives the acknowledgment message, the source transmits at least one additional message to the destination that corresponds to the requested data.

23. The device in claim 22, wherein each of the at least one additional message is configured by encapsulating a first packet of data within a second packet of data, prefixing a header of the first packet with an address of the proxy and the second packet with an address of the destination.

24. The device in claim 23, wherein the header of the first packet is stripped off after the message is received by the proxy, while the second packet is forwarded to the destination.

25. The device in claim 24, wherein the destination responds to the proxy after receiving the second packet by sending an acknowledgment message to the proxy.

26. The device in claim 25, wherein after the two simultaneous connections are established, the source responds to the acknowledgment message by transmitting at least one additional message to the destination that corresponds to the requested data and the destination responds to the initial message by transmitting an acknowledgment message to the proxy.

27. The device in claim 26, wherein the proxy responds to the acknowledgment message by transmitting at least one additional message to the destination that corresponds to the requested data.

28. The device in claim 27, wherein a plurality of proxies are located anywhere within a network and are used to forward the requested data to the destination.

* * * * *